US012115537B2

(12) United States Patent
Dobson et al.

(10) Patent No.: US 12,115,537 B2
(45) Date of Patent: Oct. 15, 2024

(54) MAGNETIC SEPARATION SYSTEM AND DEVICES

(71) Applicant: University of Florida Research Foundation, Inc., Gainesville, FL (US)

(72) Inventors: Jon P. Dobson, Gainesville, FL (US); Isaac Ernest Philip Finger-Baker, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 281 days.

(21) Appl. No.: 16/763,790

(22) PCT Filed: Nov. 14, 2018

(86) PCT No.: PCT/US2018/060883
§ 371 (c)(1),
(2) Date: May 13, 2020

(87) PCT Pub. No.: WO2019/099429
PCT Pub. Date: May 23, 2019

(65) Prior Publication Data

US 2021/0170423 A1 Jun. 10, 2021

Related U.S. Application Data

(60) Provisional application No. 62/585,581, filed on Nov. 14, 2017.

(51) Int. Cl.
*B03C 1/00* (2006.01)
*B03C 1/01* (2006.01)
(Continued)

(52) U.S. Cl.
CPC ................ *B03C 1/002* (2013.01); *B03C 1/01* (2013.01); *B03C 1/0332* (2013.01); (Continued)

(58) Field of Classification Search
None
See application file for complete search history.

(56) References Cited

U.S. PATENT DOCUMENTS 4,910,148 A * 3/1990 Sorensen .................. B03C 1/01 436/526
5,795,470 A * 8/1998 Wang ...................... B03C 1/035 210/222
(Continued)

FOREIGN PATENT DOCUMENTS

CN 101816876 A 9/2010
WO 2012/004363 A2 1/2012
(Continued)

OTHER PUBLICATIONS

International Search Report for International Application No. PCT/US2018/060883, mailed Jan. 29, 2019.
(Continued)

*Primary Examiner* — Ekandra S. Miller-Cruz
(74) *Attorney, Agent, or Firm* — Thomas| Horstemeyer, LLP

(57) ABSTRACT

Embodiments of the present disclosure include separating devices and systems and methods of use. Embodiments of the present disclosure include separation devices including magnetic arrays and sheet-flow separation chambers. In an embodiment, the separating device enables the generation of multiple, and in some configurations, intersecting, high gradient magnetic field lines, resulting in strong separation forces, which permit for scale up to large areas and/or volumes (e.g., extracorporeal blood filtration system).

13 Claims, 15 Drawing Sheets

(51) Int. Cl.
*B03C 1/033* (2006.01)
*B03C 1/28* (2006.01)

(52) U.S. Cl.
CPC ............ *B03C 1/0335* (2013.01); *B03C 1/288* (2013.01); *B03C 2201/18* (2013.01); *B03C 2201/22* (2013.01); *B03C 2201/26* (2013.01)

(56) References Cited

U.S. PATENT DOCUMENTS 5,985,153 A * 11/1999 Dolan .............. G01N 33/54366 436/526
8,585,279 B2 * 11/2013 Rida .................. C12N 15/1013 422/186.01
9,114,403 B1 8/2015 De Lange
2002/0076825 A1 * 6/2002 Cheng .............. G01N 33/54373 436/174
2007/0182517 A1 * 8/2007 Humphries ........... B03C 1/0332 335/306
2009/0053799 A1 * 2/2009 Chang-Yen ............... B03C 1/01 435/306.1
2011/0003303 A1 1/2011 Pagano
2012/0024770 A1 2/2012 Ying
2014/0021105 A1 1/2014 Lee
2016/0313332 A1 10/2016 Lee et al.

FOREIGN PATENT DOCUMENTS

WO 2017/197278 A1 11/2017
WO 2017197278 11/2017

OTHER PUBLICATIONS

Supplemental International Search Report for International Application No. PCT/US2018/060883, mailed Jul. 21, 2021.
Supplemental European Search Report mailed on Jul. 21, 2021 for European Patent Application 18879072.9.

* cited by examiner

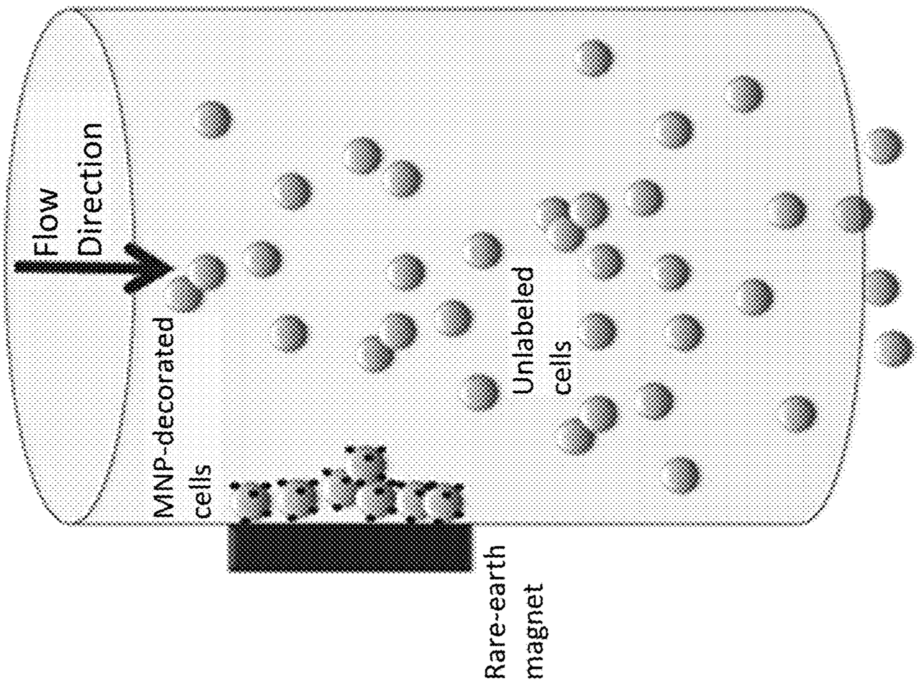
Fig. 1.1B
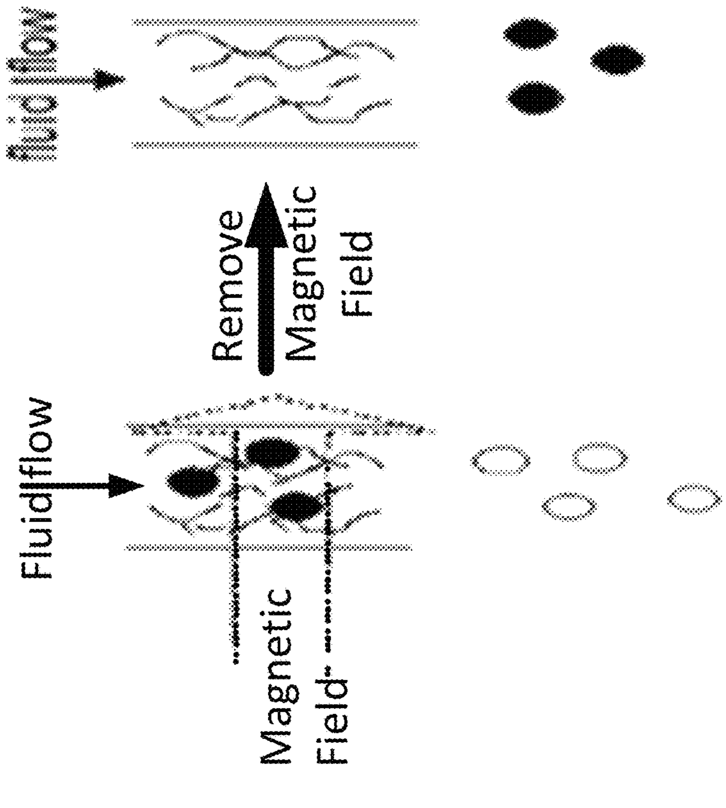
Fig. 1.1A

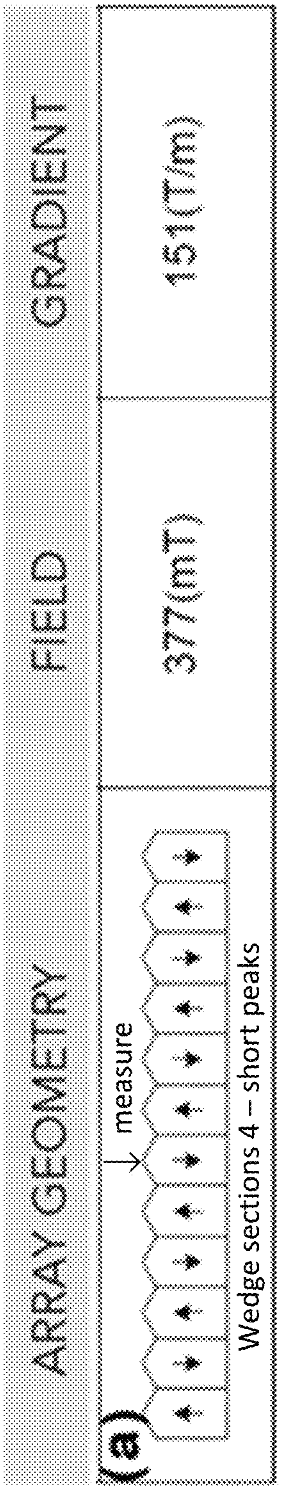
Fig. 1.2A
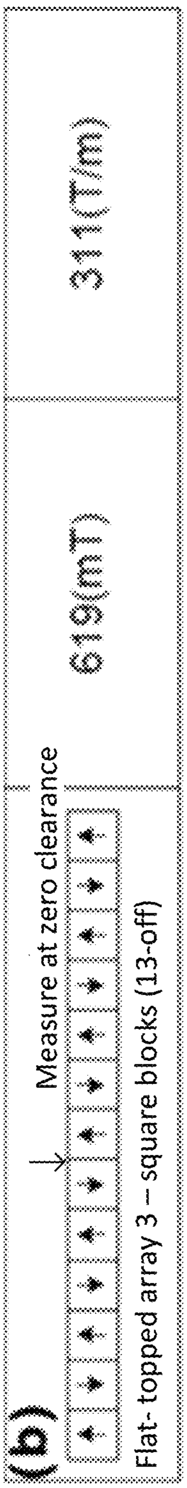
Fig. 1.2B

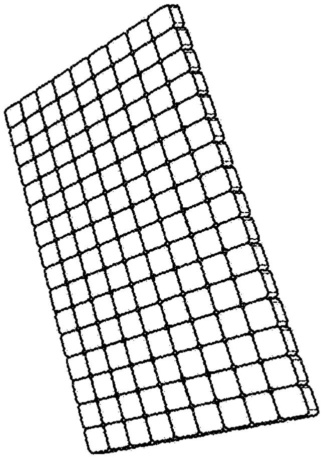
FIG. 1.3C
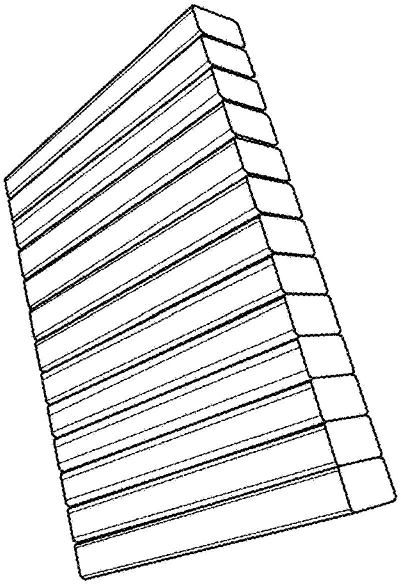
FIG. 1.3B
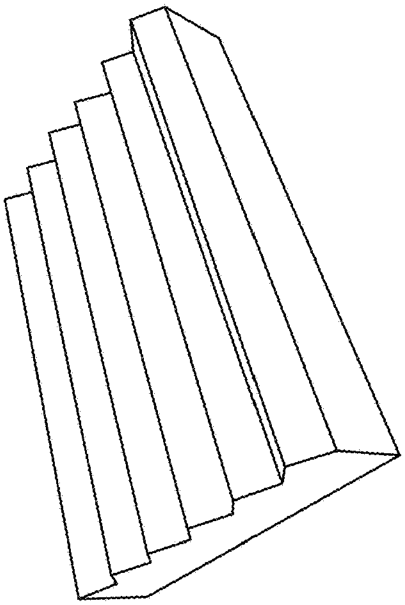
FIG. 1.3A

Fig. 1.4A
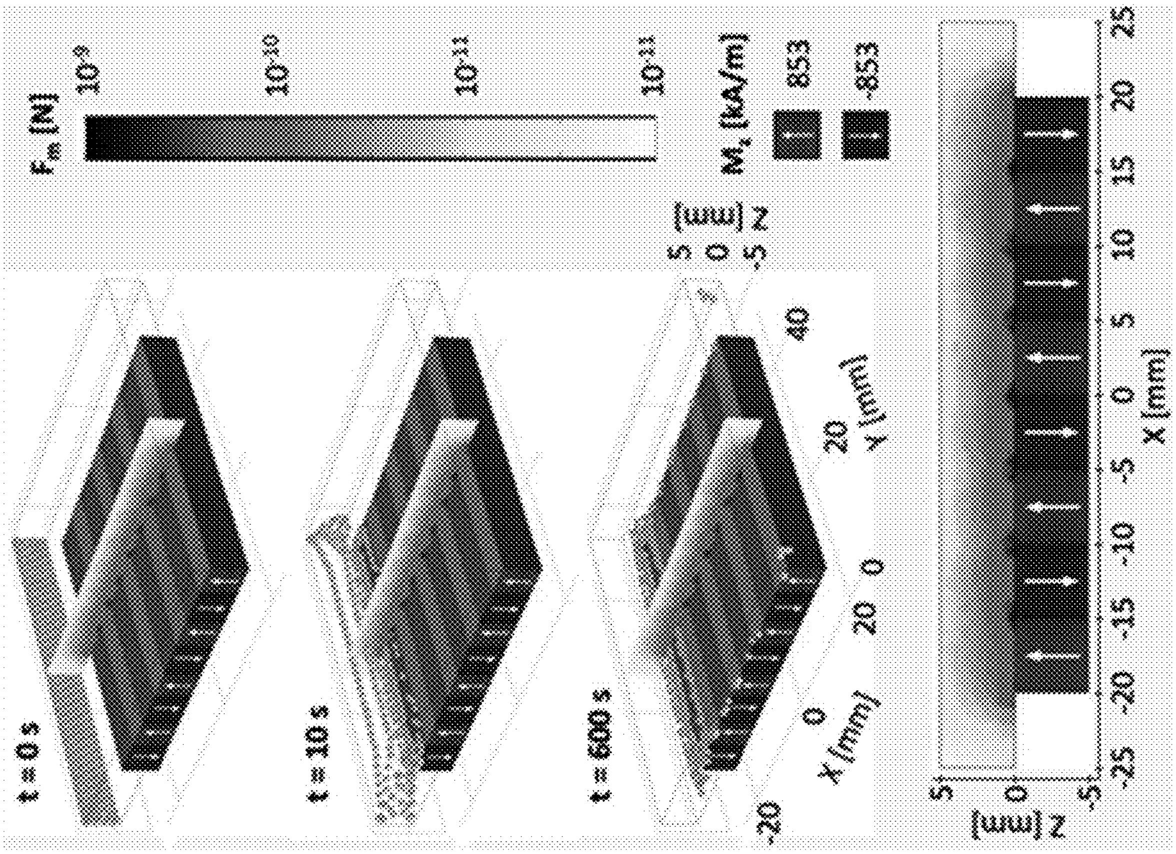

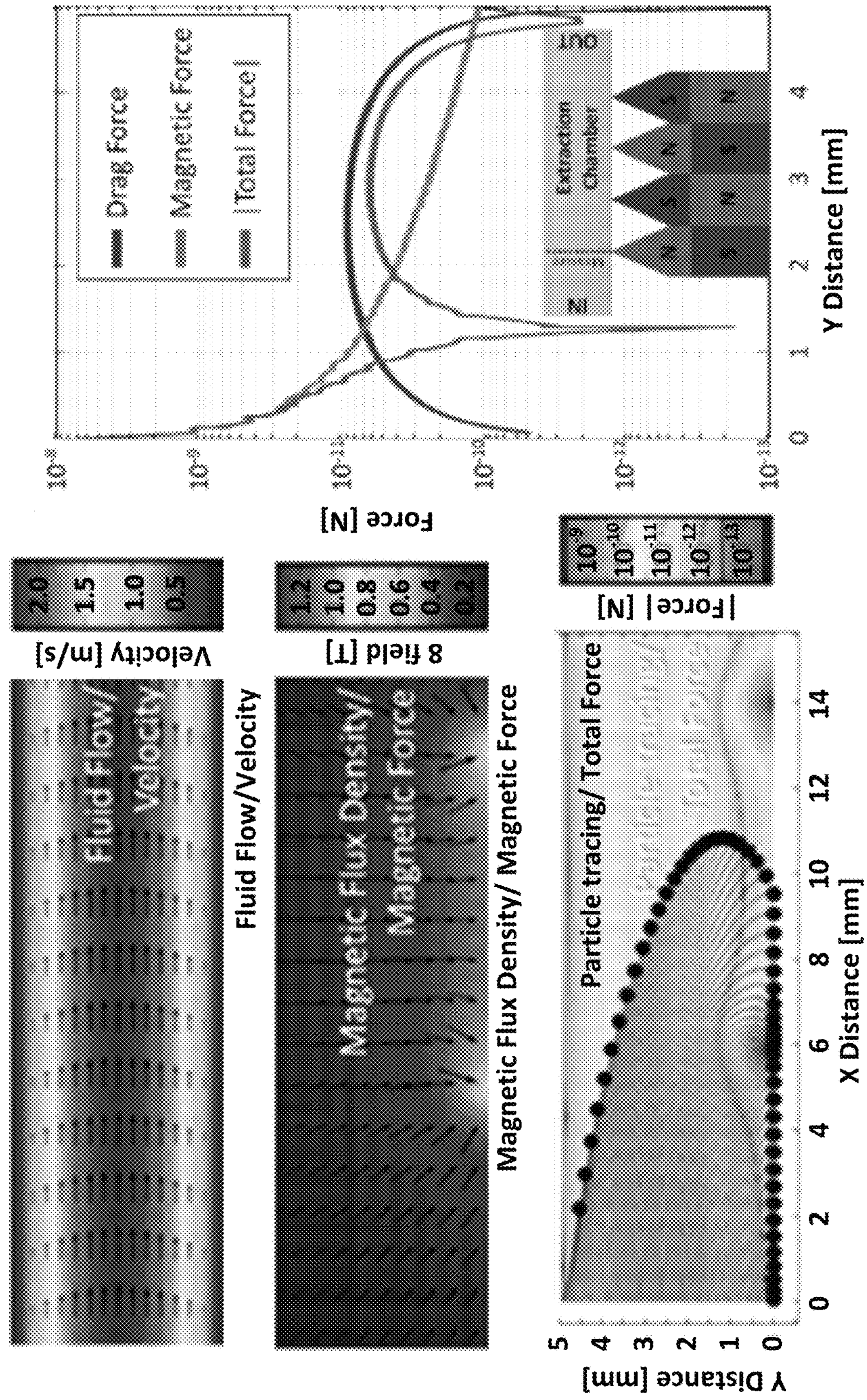
Fig. 1.4B

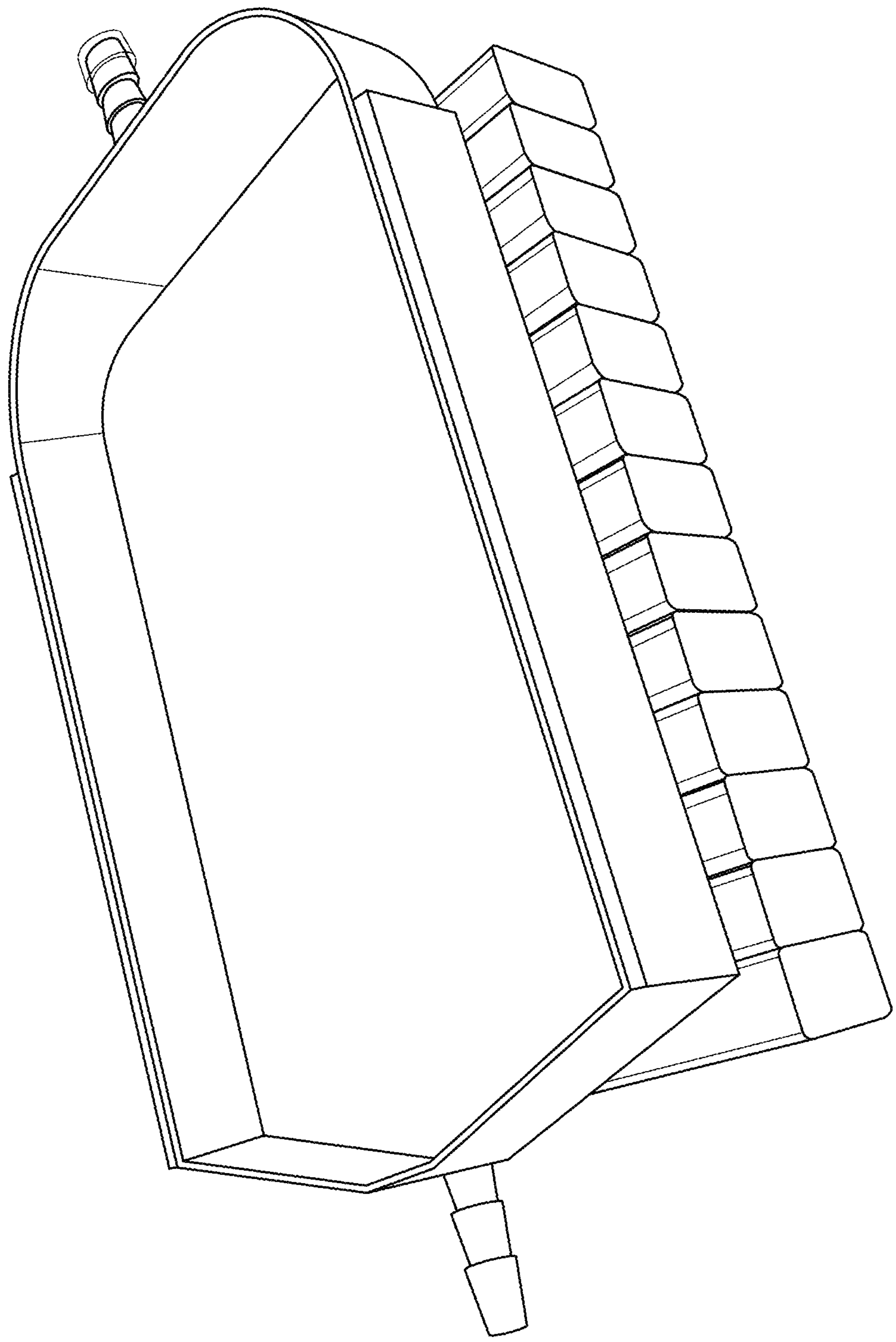
FIG. 1.5A

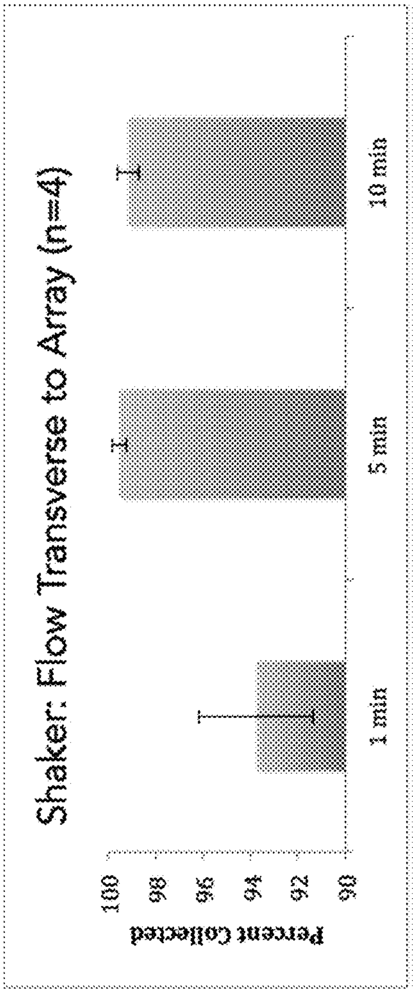
Fig. 1.5B
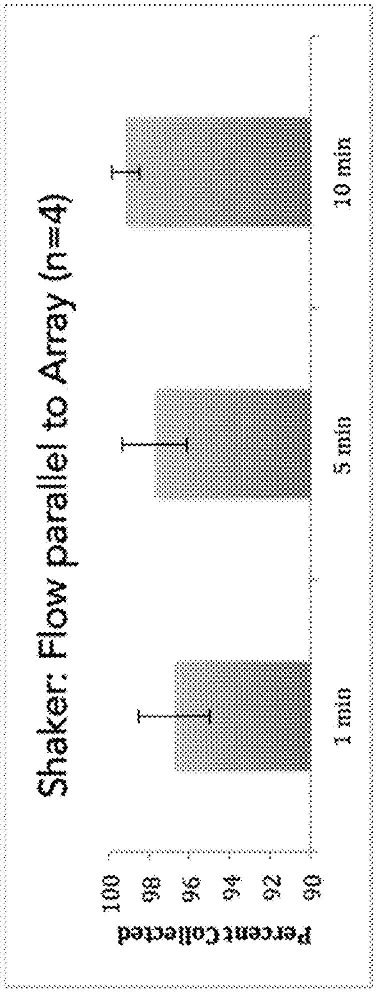
Fig. 1.5C
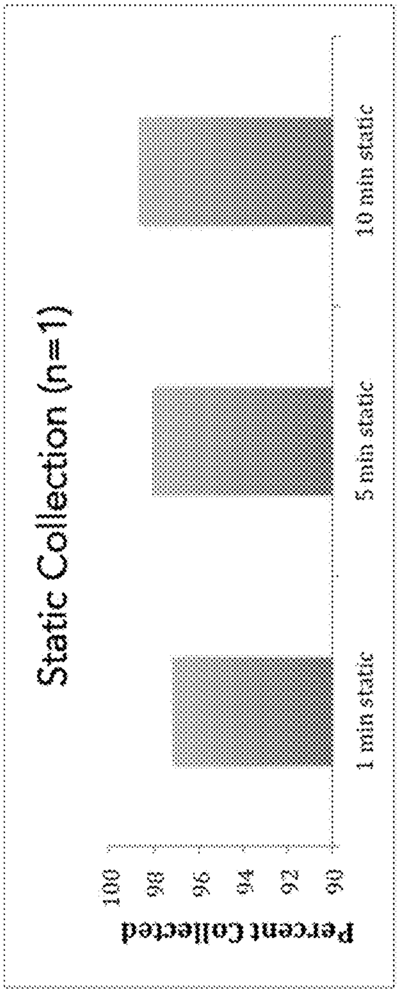
Fig. 1.5D

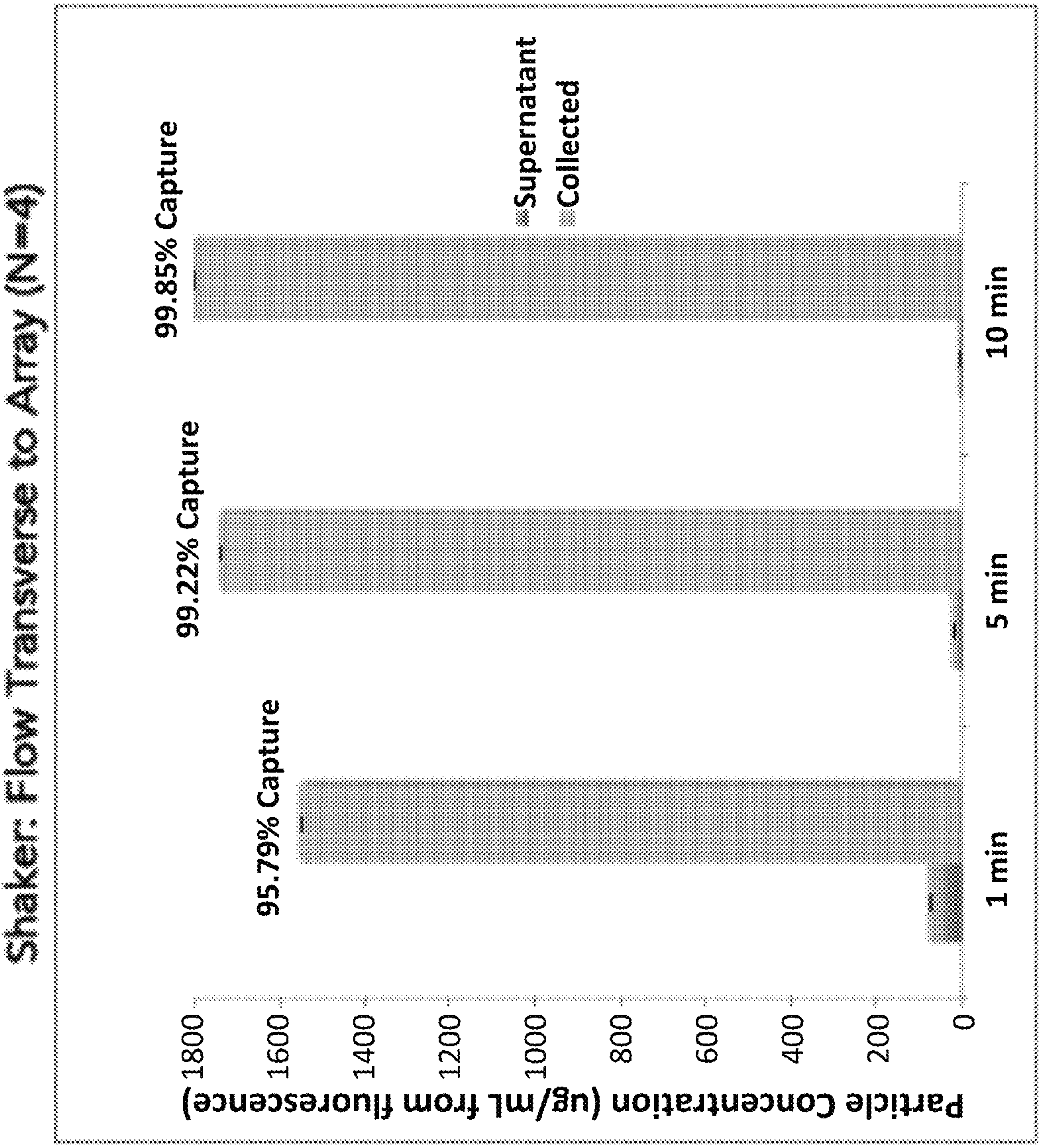
Fig. 1.5E

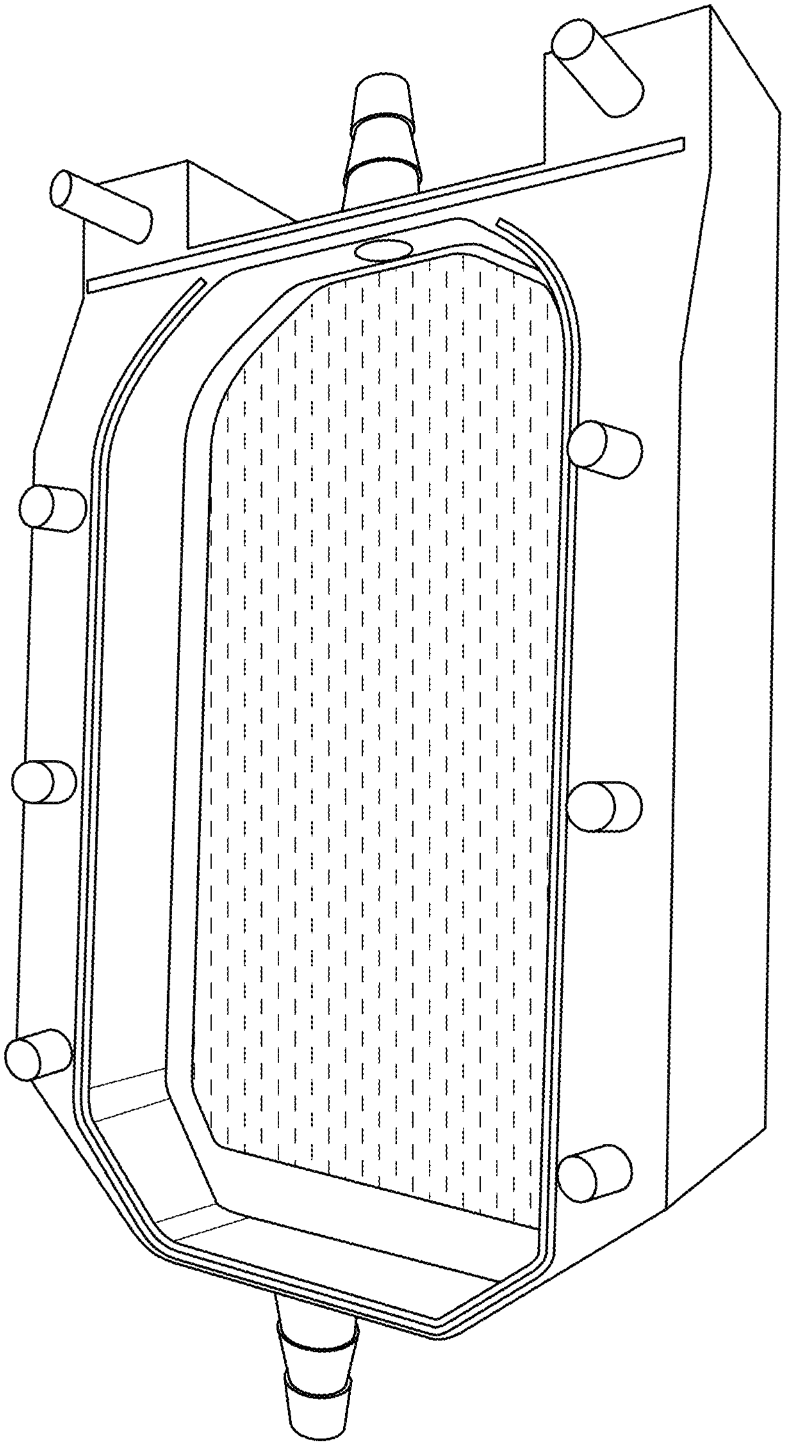
FIG. 1.6

Fig. 2.1
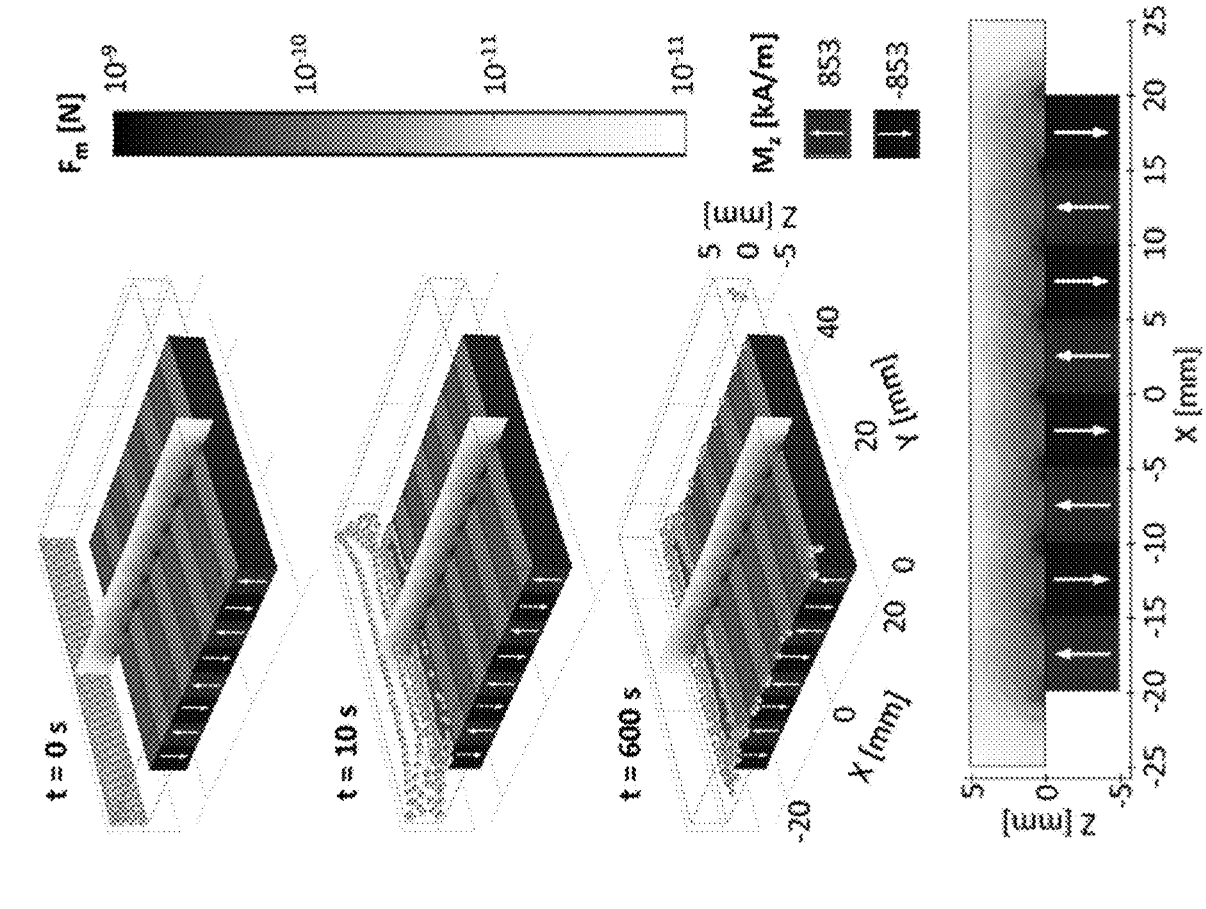

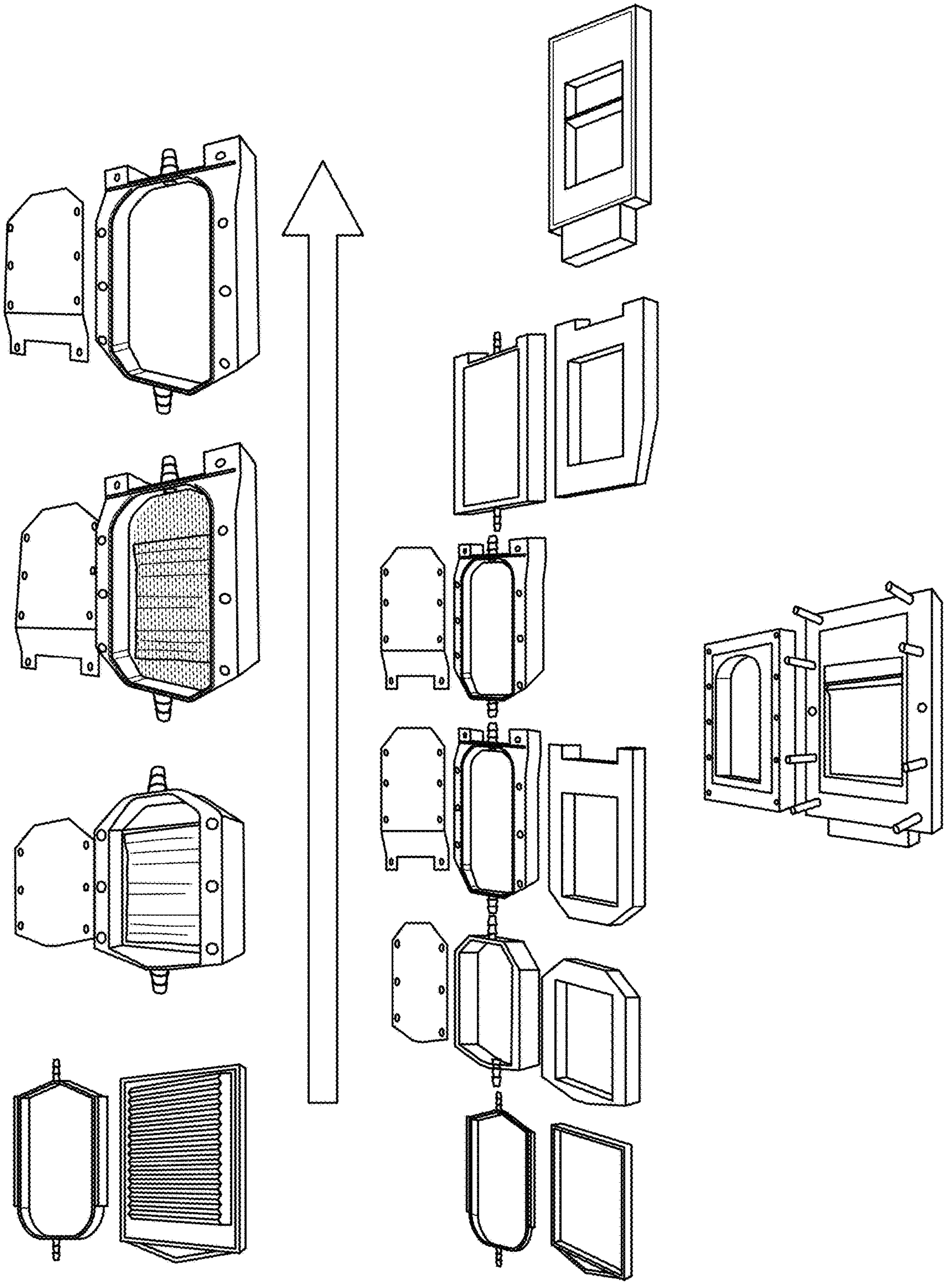
FIG. 3.1

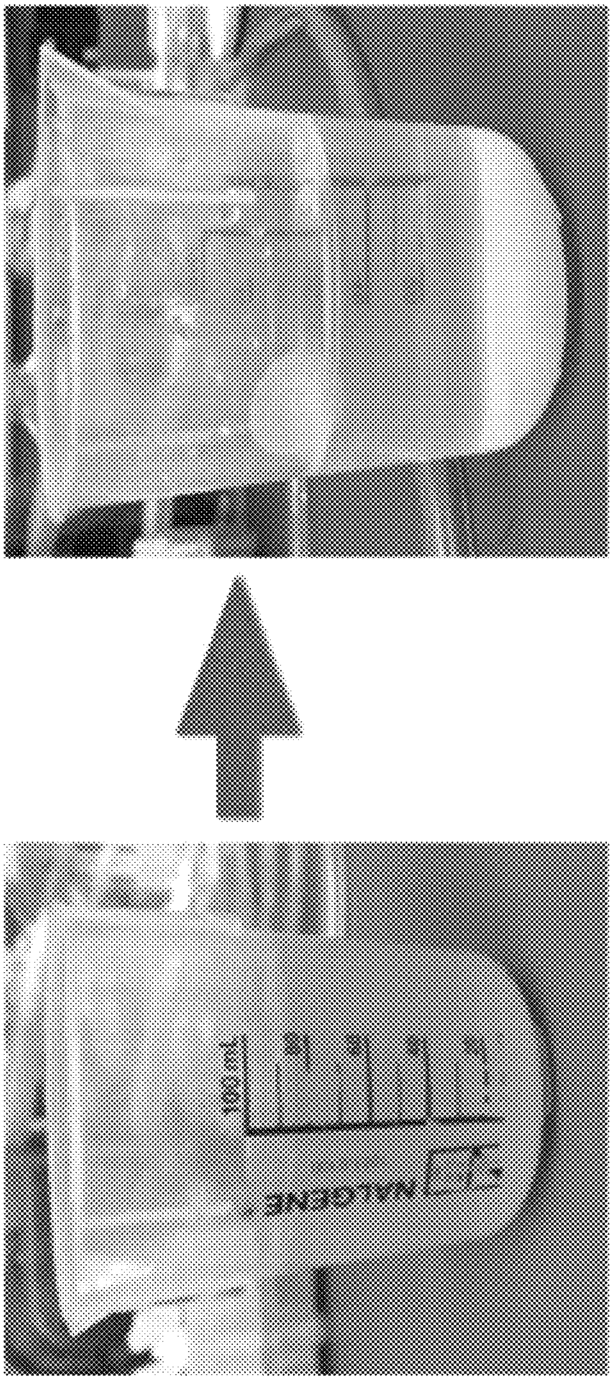
Initial Solution
Solution after filtration
Fig. 3.2

Fig. 3.3A
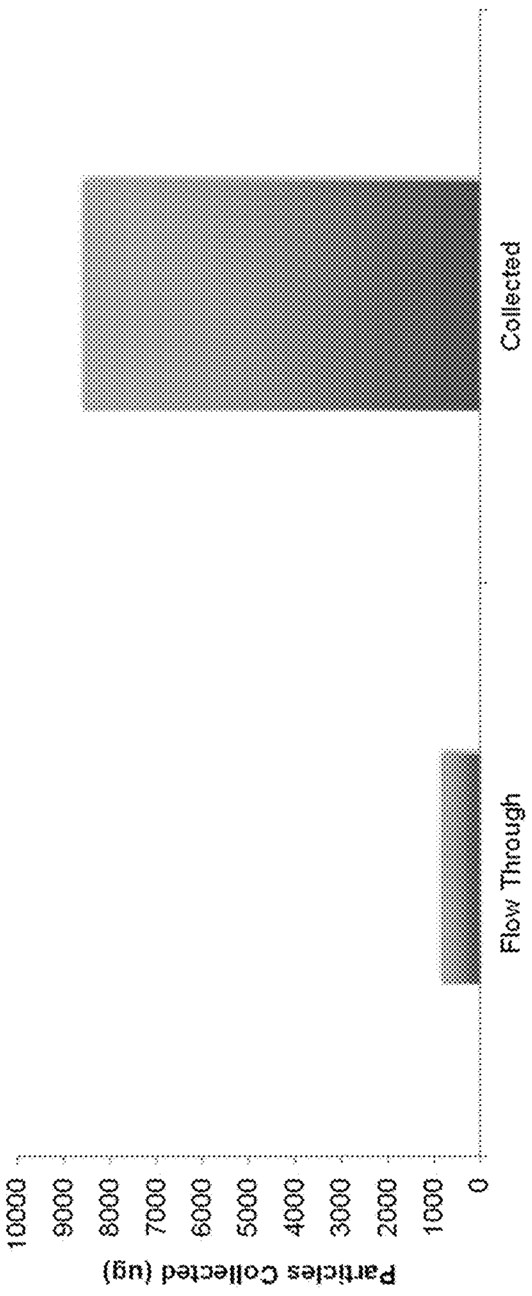
Fig. 3.3B
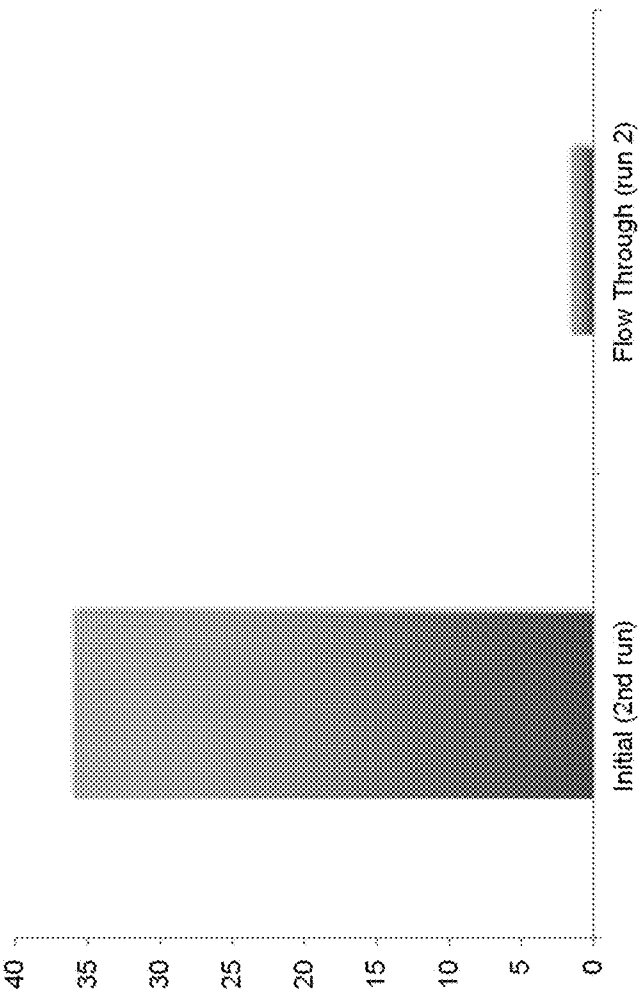

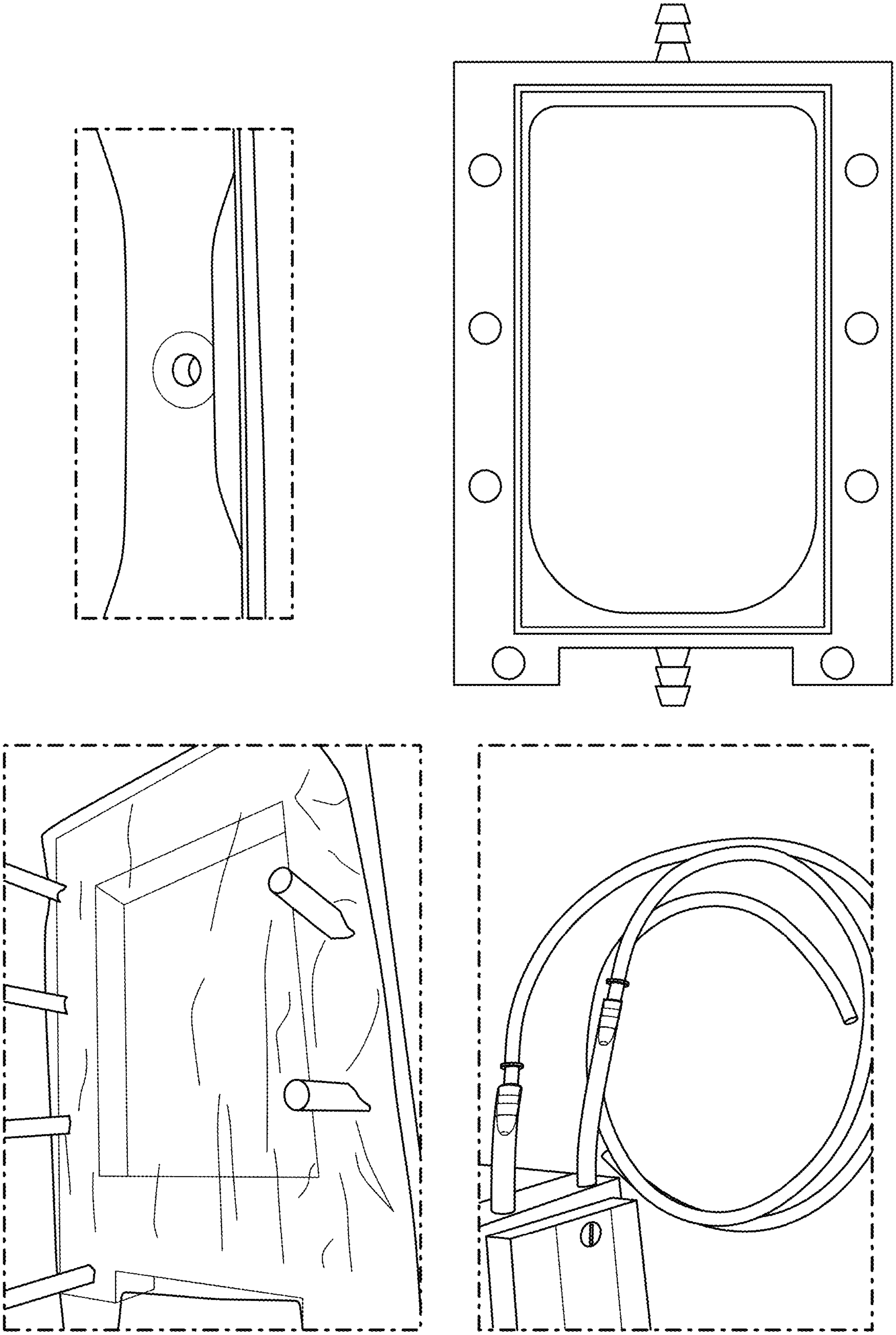
FIG. 3.4

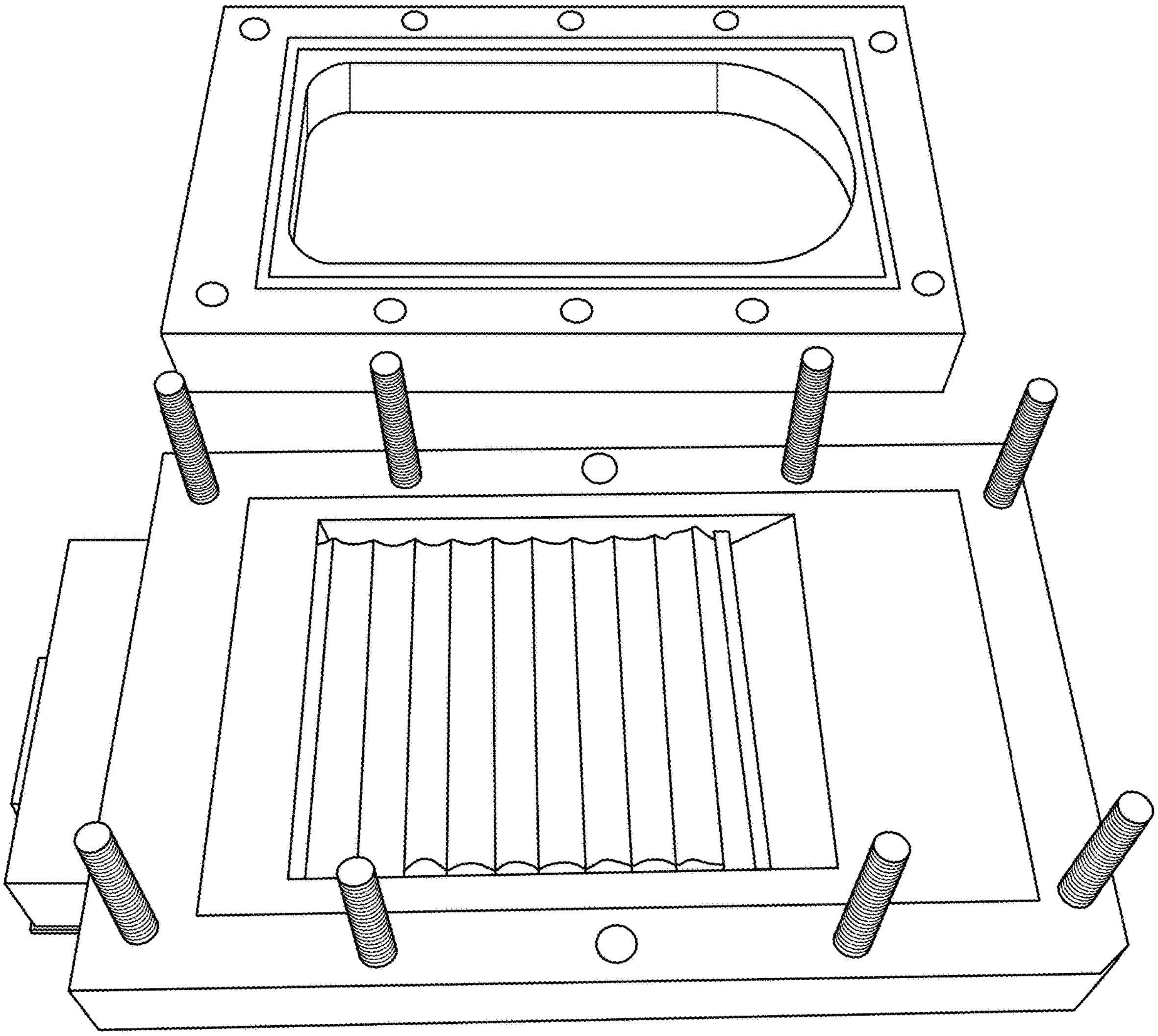
FIG. 3.5

MAGNETIC SEPARATION SYSTEM AND DEVICES

CROSS-REFERENCE TO RELATED APPLICATIONS

This application is the 35 U.S.C. § 371 national stage of PCT application having serial number PCT/US2018/060883, filed on Nov. 14, 2018. This application also claims the benefit of and priority to U.S. Provisional Application Ser. No. 62/585,581, having the title "MAGNETIC SEPARATION SYSTEM AND DEVICES", filed on Nov. 14, 2017, the disclosure of which is incorporated herein by reference in its entirety.

FEDERAL FUNDING

This invention was made with government support under Contract No. R21 EB020807 from National Institutes of Health. The government has certain rights in the invention.

BACKGROUND

Magnetic cell and biomolecule separation is used in biomedicine to tag/label biological entities and separate them from fluid samples for analysis or therapeutic use. Current magnetic separation methods are effective for many bio-separation applications, but not all applications.

SUMMARY

Embodiments of the present disclosure include separating devices and systems and methods of use. Embodiments of the present disclosure include separation devices including magnetic arrays and sheet-flow separation chambers.

In an aspect, the present disclosure includes a separation device, among others, that includes: a magnetic array, and a sheet-flow separation chamber having one or more of each of an entrance opening and an exit opening, wherein the sheet-flow separation chamber is disposed on top of the magnetic array, wherein magnetic particles in a fluid are separated as the fluid flows across the sheet-flow separation chamber from the entrance opening to the exit opening(s). In an aspect, the magnetic array is configured to generate multiple high gradient field lines that result in strong separation forces applied to the magnetic particles. In a particular aspect, the magnetic array is configured to generate multiple, intersecting, high gradient field lines that result in strong separation forces applied to the magnetic particles. In one aspect, the magnetic array is a magnetic wedge array including a plurality of wedge magnets, where the flow direction of the fluid is perpendicular to the length of each wedge magnet. In another aspect, the magnetic array is a magnetic block array including a plurality of block magnets, wherein the flow direction of the fluid is perpendicular to the length of each block magnet. In yet another aspect, the magnetic array is a magnetic "checkerboard" array including a plurality of block magnets. In an aspect, the magnetic array is made of a rare earth metal. In another aspect, additional magnet, stack arrays, and combinations thereof can be added to scale up to handle large volume and/or flow rates, in this regard, embodiments of the present disclosure are scalable.

In an aspect, the present disclosure includes a method of separating magnetic particles, among others, that includes: flowing a liquid including magnetic particles across a sheet-flow separation chamber of a separation device, wherein the sheet-flow separation chamber is disposed adjacent a magnetic array, generating multiple high gradient field lines using the magnetic array, wherein the multiple high gradient field lines result in separation forces applied to the magnetic particles; and separating the magnetic particles from the liquid using the high gradient field lines of the magnetic array. In an aspect, the sheet-flow separation chamber has at least one of each of an entrance opening and an exit opening, where the sheet-flow separation chamber is disposed on top of the magnetic array. In an aspect, the magnetic particles in a fluid are separated as the fluid flows across the sheet-flow separation chamber from the entrance opening to the exit opening, minimizing the distance between the particles and the field source, resulting in greater force applied to the particles throughout the entire fluid volume.

Other devices, methods, features, and advantages will be or will become apparent to one with skill in the art upon examination of the following drawings and detailed description. It is intended that all such additional devices, methods, features and advantages be included within this description, be within the scope of the present disclosure, and be protected by the accompanying claims.

BRIEF DESCRIPTION OF THE DRAWINGS

Further aspects of the present disclosure will be more readily appreciated upon review of the detailed description of its various embodiments, described below, when taken in conjunction with the accompanying drawings.

FIGS. 1.1A-B illustrate the principles of magnetic cell separation. Cells in suspension decorated with magnetic micro- or nanoparticles are attracted to (FIG. 1.1A) magnetized steel wool, or (FIG. 1B) high-gradient NdFeB magnets as they pass through the column. Unlabeled cells pass through without being captured. After the sample has cleared the column, the magnet is removed, and the supernatant is washed out with the target cells. Note: MNP=magnetic nanoparticle.

FIGS. 1.2A-B illustrate a COMSOL® theoretical prediction of maximum flux density and magnetic field gradient for (FIG. 1.2A) the wedge array, and (FIG. 1.2B) the block array of NdFeB magnets.

FIGS. 1.3A-C illustrate examples of initial prototype NdFeB high gradient magnet arrays: (FIG. 1.3A) wedge array, (FIG. 1.3B) block array, (FIG. 1.3C) checkerboard array.

FIG. 1.4A illustrates 3D COMSOL® simulation of magnetic particle capture for an 8-element, 5 mm×5 mm×40 mm NdFeB block magnet array. Flow rate=$1.6\times10^{-7}$ $m^3/s$. FIG. 1.4B illustrates 2D COMSOL® simulation of magnetic particle capture for a 4-element wedge array. In both cases, particles were assumed to be a diamagnetic polymer with a hydrodynamic diameter of 5 μm and 20% loading of $Fe_3O_4$ superparamagnetic nanoparticles.

FIG. 1.5A illustrates an example of the initial prototype of the continuous sheet-flow separation chamber on top of the NdFeB block array. Additional prototypes can include housing for the array onto which the separation chamber can connect. FIGS. 1.5B-E illustrate graphs of the magnetic capture of fluorescent/magnetic 1 μm microspheres using the rectangular block array. Total fluid volume=5 mL. Particle concentration=~1.8 mg/mL. Error bars=standard deviation. Data obtained using Prototype 1 either in a static configuration or on a rocker/shaker plate oscillating @ 1 Hz. Quantification was obtained using UV-Vis.

FIG. 1.6 is an example of a sheet-flow separation chamber.

FIG. 2.1 illustrates a magnetic nanoparticle 3D tracking simulation inside a channel over alternate neodymium-iron-boron magnet array for t=0 s, 10 s and 600 s. Simulated fluid is water with inlet velocity of $1.6\times10^{-7}$ $m^3/s$.

FIG. 3.1 illustrates an exemplary embodiment of a particle separation system design.

FIG. 3.2 illustrates testing of an embodiment of the present disclosure.

FIGS. 3.3A-3.3B show the particle separation in a sheet flow system of the present disclosure.

FIGS. 3.4 and 3.5 show some examples of the particle separators of the present disclosure using different chamber geometries and polymer film materials.

DETAILED DESCRIPTION

This disclosure is not limited to particular embodiments described, and as such may, of course, vary. The terminology used herein serves the purpose of describing particular embodiments only, and is not intended to be limiting, since the scope of the present disclosure will be limited only by the appended claims.

Where a range of values is provided, each intervening value, is to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method may be carried out in the order of events recited or in any other order that is logically possible.

Embodiments of the present disclosure will employ, unless otherwise indicated, techniques of inorganic chemistry, materials science, nanotechnology and the like, which are within the skill of the art. Such techniques are explained fully in the literature.

Prior to describing the various embodiments, the following definitions are provided and should be used unless otherwise indicated.

Unless otherwise defined, all technical and scientific terms used herein have the same meaning as commonly understood by one of ordinary skill in the art of inorganic chemistry, materials science, and/or nanotechnology. Although methods and materials similar or equivalent to those described herein can be used in the practice or testing of the present disclosure, suitable methods and materials are described herein.

As used in the specification and the appended claims, the singular forms "a," "an," and "the" may include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

DISCUSSION

Embodiments of the present disclosure include separating devices and systems and methods of use. Embodiments of the present disclosure include separation devices including magnetic arrays and sheet-flow separation chambers. An example continuous sheet-flow magnetic separation chamber device is shown in FIG. 1.6. The magnet arrays are placed in the bottom part of the chamber, beneath the polymer film (shown in yellow in FIG. 1.6). The fluid sample inlet is shown on the right while the outlet is shown on the left. A cover attaches to the top and is sealed against leakage. Fluid, including magnetic particles mixed with the target cells or molecules, is pumped through the inlet via an external pump. In an embodiment, the separating device enables the generation of multiple, and in some configurations, intersecting, high gradient magnetic field lines, resulting in strong separation forces, which permits for scale up to large areas and/or volumes (e.g., extracorporeal blood filtration system).

In an embodiment, the magnetic array has arrangements of rare earth magnets designed to create lines of high magnetic field gradients. In this regard, the separating device can be used to attract and separate magnetic particles (e.g., magnetic conjugates include magnetic particles attached to target biomolecules or cells). The separator device can also be used in a sheet flow configuration for high volume or rapid low volume separation.

In an embodiment, magnet configurations that generate high field gradients over large areas which, when coupled with novel sheet-flow separation chambers, enable faster and more efficient separation (e.g., magnetic conjugate cell and biomolecule separation), and are easily scalable to handle large volume separations. As a result, embodiments of the present disclosure would not only have a significant impact in large volume cell and biomolecule separation but may enable the implementation of clinical, extra corporeal magnetic filtration systems for inflammatory cytokine extraction, circulating stem cells, circulating cancer progenitor cells, and blood filtration.

Embodiments of the present disclosure include separation devices including permanent magnet array (e.g., rare earth magnet (NdFeB) array geometries) and sheet-flow separation chamber that are easily scalable and provide enhanced magnetic capture of biomolecules and cells from fluid samples. The sheet-flow design can be scaled for higher throughput by making larger arrays or stacking multiple arrays, while keeping the height of the separation chamber constant and optimized for magnetic conjugate cell and biomolecule capture, which results in increased throughput without significant increases in the fluid velocity.

In an aspect, the magnetic array can be under the sheet-flow separation chamber, on top of the sheet-flow separation chamber, on the side of the sheet-flow separation chamber, or a combination there. In an aspect, the magnetic array can include two or more (e.g., 100 or more) magnets.

In an aspect, the permanent magnet array geometries are designed to increase the force on magnetic particles within the magnetic separator using separation chamber geometries based on sheet flow rather than cylindrical systems, such as those currently on the market. As a result, the rare earth magnet arrays with high magnetic field gradients covering larger areas and magnetic separation chamber having a geometry to expose all particle-target conjugates to the stronger gradient/force via sheet flow are provided. In an aspect, three high-gradient permanent magnet array designs (FIGS. 1.3A-C) are provided herein and these arrays produce lines of high magnetic field gradient across large surface areas. In an aspect, the magnet array geometries can vary and can include those described in FIGS. 1.3A, 1.3B, and 1.3C, combinations of those, other geometries adjacent the sheet-flow separation chamber such as rounded shape (s) (e.g., symmetrical or asymmetrical), saw tooth on each magnet, interconnecting triangles of two or more different magnets, as well as other polygonal shapes (e.g., using one or more magnets). In addition, the magnetic wedge array can include two or more different types of shaped magnets within the array (e.g., a combination of wedge shaped and flat magnets. The exact configuration can be designed to achieve the desired magnetic field vector orientation, where the combination of the magnetic forces produce high field gradients, where the high field gradient has areas that capture the magnet particle of interest.

An embodiment of the present disclosure includes a magnetic wedge array as shown generally in FIG. 1.3A. A plurality of wedge shaped or triangular shaped magnets can be placed side-by-side, where the flow of the fluid including the magnetic targets flows perpendicular to the length of the wedge shaped magnets. In other words, the flow is across the wedge edges as opposed along the wedge edges. The magnets positioned adjacent one another can have a different magnetic field vector orientation, where the combination of the magnetic forces produce high field gradients, where the high field gradient has areas that capture the magnet particle of interest (e.g., magnetic conjugate). In an embodiment, the magnetic force applied independently to each particle by the magnet array can be about $10^{-7}$ to $10^{-12}$ Newtons. However, the magnetic force applied can vary depending upon the material used for the particles, the volume of the magnetic particle, and the magnetic field gradient. As described below and in the Examples, the magnetic array can be modeled to produce the desired magnetic gradient field and force.

One dimensional and two dimensional COMSOL theoretical models of wedge magnet arrays have demonstrated that very high gradients (e.g., >about 100 T/m) can be achieved at the apex of the wedge (FIGS. 1.4A and 1.4B). These higher gradients will increase the force on the particles, facilitating enhanced magnetic force and more rapid separation of magnetic conjugates. The arrays can be closely spaced and cover large areas to enhance capture from high volumes during sheet flow.

In an embodiment, the number of magnets in the array can be 1 to 1000 or 1 to 100. In an embodiment, the length of each magnet can be about 1 cm to 1.5 m. In an embodiment, the height from the bottom to the apex of the wedge can be about 0.5 cm to 5 cm. In an embodiment, the height from the bottom to the point at which tapering occurs to form the wedge is about 0.5 cm to 4 cm. In an embodiment, the height from the point at which tapering occurs to the apex of the wedge is about 0.5 cm to 1 cm. In an embodiment, the angle of tapering (e.g., the angle between a plane parallel the side of the magnet and a plane parallel the slope of the taper of the wedge, where the two planes intersect at the point where the tapering starts) can be about 30° to 45°. In an embodiment, the width at the bottom of the magnet up to the point of tapering can be about 5 mm to 5 cm.

In another embodiment, a magnetic block array design can be used (FIGS. 1.3B and 1.3C). A plurality of block shaped magnets can be placed side-by-side, where the flow of the fluid including the magnetic targets flows perpendicular to the length of the block shaped magnets. The magnets positioned adjacent one another can have a different magnetic field vector orientation (e.g., alternating north-south in adjacent magnets), where the combination of the magnetic forces produce high field gradients at the joins or joining region between rectangular block magnet segments, where the high field gradient areas at the join can capture the magnet particle of interest (e.g., magnetic conjugate). In an embodiment, the magnetic force applied independently to each particle by the magnet array can be about $10^{-7}$ to $10^{-12}$ Newtons. However, the magnetic force applied can vary depending upon the material used for the particles, the volume of the magnetic particle, and the magnetic field gradient.

In an embodiment, the number of magnets in the array can be 1 to 1000 or 1 to 100. In an embodiment, the length of each magnet can be about 1 cm to 1.5 m. In an embodiment, the height can be about 0.5 cm to 5 cm. In an embodiment, the width can be about 5 mm to 5 cm.

In another embodiment, a magnetic "checkerboard" array design can be used (FIG. 1.3C). A plurality of checkerboard block shaped magnets can be placed side-by-side in a pattern similar to a checkerboard. The checkerboard pattern is not limited to the 64 blocks (or squares if viewed from above) and may vary from 4 to 10,000 or more. In addition, the dimensions (length and width) can be identical but do not have to be identical. The magnets positioned adjacent one another can have a different field vector orientation (alternating north-south in adjacent magnets), where the combination of the magnetic forces produce high field gradients at the joins between each magnet, where the high field gradient areas at the joins can capture the magnet particle of interest (e.g., magnetic conjugate). In an embodiment, the magnetic force applied independently to each particle by the magnet array can be about $10^{-7}$ to $10^{-12}$ Newtons. However, the magnetic force applied can vary depending upon the material used for the particles, the volume of the magnetic particle, and the magnetic field gradient.

In an embodiment, the number of magnets in the checkerboard array can be 4 to 10,000. In an embodiment, the length of each magnet can be about 2 mm to 10 cm. In an embodiment, the height can be about 20 mm to 10 cm. In an embodiment, the width can be about 2 mm to 10 cm. In an embodiment, the checkerboard array can include wedges as described herein for each checkerboard magnet.

In an embodiment, the magnetic arrays can be made of materials such as rare earth metals. In an embodiment, the rare earth metal can include NdFeB, SmCo, and AlNiCo, as well as electromagnet (e.g., conducting coil loops and solenoids). The magnets can be made using methods known in the art or purchased.

In regard to designing the different embodiments of the arrays, COMSOL models can be used to determine magnet size, spacing, dimensions and/or number to achieve the desired magnetic field gradient. The force on magnetic particles within a fluid sample is proportional to the field gradient according to the equation:

$$F_m = (m \bullet \nabla)B = \frac{V_m \Delta\chi}{\mu_0}(B \bullet \nabla)B$$

where F is the magnetic translational force directed towards the field source, $\chi$ is the magnetic susceptibility, B is the magnetic flux density, m is the magnetic moment, $\mu_0$ is the magnetic permeability of free space, and $V_m$ is the volume of magnetic material. In magnetic separation systems, this magnetic force must exceed the Stoke's drag force as the sample moves through the separation chamber:

$$F_m > F_D \text{ where } F_D = 6\pi\eta R_m \Delta v$$

where $F_D$ is the drag force, η is the dynamic viscosity, $R_m$ is the radius of the particle and v is the fluid velocity. As the magnetic field gradient decreases rapidly with distance from the magnet, scaling these systems presents a difficult problem—in fact, this is a major reason that there are so few high-volume/throughput systems on the market. Increasing the force and the area over which it applies impacts both the speed of magnetic particle (e.g., magnetic conjugate) separation as well as simplifying scale-up via the use of large-area, low-height separation chambers.

The sheet-flow separation chambers can be disposed on top of the magnetic array so that the flow of the fluid is appropriate for the selected magnetic array. In an embodiment, the sheet-flow separation chamber includes one or more entrance openings and one or more exit openings, where the fluid flows through the one or more entrance openings and out of the one or more exit openings. As mentioned above, as the fluid flows across the magnetic array, the magnetic field gradient causes the magnetic particles (e.g., magnetic conjugates) to become separated from the fluid and attracted to the bottom of the separation chamber by the magnet array. Once the flow of the fluid is complete, the magnetic particles can be collected by separating the sheet-flow separation chamber from the magnetic array and upon separation, the magnetic particles can flow freely.

In an aspect, sheet-flow can be defined as where the dimensions in plane are at least three times the dimension perpendicular to the plane.

In an embodiment, the length and/or width of the sheet-flow separation chamber is similar to that of the array or less than that of the array. In this regard, the length and/or width can be selected based on the flow and/or depth of the fluid in the sheet-flow separation chamber. The depth of the fluid should be kept within a range to achieve the desired separation of the magnetic particles from the fluid. In an embodiment, the depth of the fluid is minimized since the magnetic field gradient only extends a certain distance above the magnetic array. In an embodiment the depth of the fluid is about 100 microns to 5 cm. In addition, the flow of the fluid is about 0.01 to 10 liters per minute. Also, the height of the sheet-flow separation chamber can be about 150 microns to 10 cm or more depending upon the application. In an embodiment, the sheet-flow separation chamber can be made of materials such as silica/glass, polylactic acid, polyethylene, and polycarbonate.

The separation device can also include systems or devices to introduce the fluid to the sheet-flow separation chamber and to remove the fluid from the sheet-flow separation chamber.

In an embodiment, the fluid can be introduced to the sheet-flow separation chamber but not operated in a flow-mode (e.g., the entrance and/or exit openings can be closed). In this embodiment, the sheet-flow separation chamber and the magnet array can be positioned on a rocker platform oscillating at between 0.25 and 20 Hz. In this way the fluid and the magnetic conjugates are exposed to the magnetic field gradient and are separated from the fluid (See FIGS. 1.5A-E).

In an aspect, the fluid can water, blood, a bodily fluid, saline, PBS, other fluids used in or associated with biological analysis, separation, or the like, or a combination thereof. In particular, embodiments of the present disclosure can be used in vaccine production, antibody production, and the like as well as in the separation, analysis, detection of one or more biological components associated with sepsis and cancer (e.g., leukemia), as well other conditions of diseases.

While embodiments of the present disclosure are described in connection with the Examples and the corresponding text and figures, there is no intent to limit the disclosure to the embodiments in these descriptions. On the contrary, the intent is to cover all alternatives, modifications, and equivalents included within the spirit and scope of embodiments of the present disclosure.

Example 1

Magnetic cell and biomolecule separation is used in biomedicine to tag/label biological entities and separate them from fluid samples for analysis or therapeutic use. Current magnetic separation methods are effective for many bio-separation applications and the development of improved systems continues apace, primarily due to the size of the cell and biomolecule separation market. For cell separation alone, the use of separation technologies to isolate biomolecules and target cells from a heterogeneous cell population is expanding rapidly. The global market for cell separation technologies was $2.5 billion in 2014 and is expected to grow to 5.1 billion by 2019; an annual growth rate of nearly 16% [1].

Of the technologies currently on the market for cell separation, magnetic particle-based separation represents a $200 billion/year market with an annual growth rate of 9.1%. These magnetic separation technologies include both a magnetic separator (hardware) and magnetic nanoparticles and microparticles (consumables). While magnetic separation technologies represent a large market, in some cases these systems suffer from relatively low purity and recovery rates, slow accumulation rates (permanent magnets), settling issues (magnetic matrices), and clogging [Pankhurst et al., 2003; Kimura et al., 2015; 2; 3]. For these reasons, magnetic separation is often used as a pre-enrichment step before fluorescence-activated cell sorting (FACS) [3].

In magnetic cell separation systems magnetically labeled cells or biomolecules are extracted from biological fluids containing a non-labeled cell population using high gradient magnetic separator technology. In 1990, Miltenyi et al.[4] introduced a magnetic cell separation system employing fluorescently-labeled, antibody-conjugated magnetic microparticles in combination with a separation column filled with steel wool (FIG. 1.1A). A static magnetic field magnetizes the steel wool, enabling trapping of the magnetically labeled cells. With the magnetic field in place, unlabeled cells and the fluid supernatant are washed through the column. After removing the magnetic field, the cells decorated with magnetic particles or target biomolecules attached to the particles are released from the steel wool in a simple washing step, allowing for efficient, rapid cell and biomolecule separation [Kozissnik, B and J Dobson (2013) Biomedical applications of magnetic nanoparticles. *MRS Bulletin* 38: 927-931].

In order to address challenges, such as low target antigen expression levels on the surface of some cells, McCloskey et al.[5] modeled three different scenarios to enhance the magnetophoretic mobility (the movement of magnetic particles, and the cells to which they are attached, along a field gradient). It was found that microparticles (particles with hydrodynamic diameters of more than 1 μm) improve the magnetophoretic mobility of cells by several orders of magnitude in comparison to nanoparticles (<100 nm). However, one of the major issues with both magnetic separation and FACS is the practical difficulties associated with scale-up to large-scale volume processing for life sciences and the pharmaceutical industry. For magnetic separation systems, scale-up can be an issue as the separation efficiency is dependent on the magnetic field gradient. As the gradient drops off rapidly with distance from the magnetic source, sorting large volumes, such as those required in vaccine production and extracorporeal filtering, presents challenges. Clearly, improvements in magnetic capture efficiency and throughput would enable magnetic separation to capture a much larger portion of the global cell and biomolecule separation market as it has significant advantages over FACS—primarily much lower cost and higher throughput. For systems that employ a magnetizable mesh, clogging of the mesh and tube hinder high-volume separation.

While magnetic separation technologies represent a large market, they may suffer from relatively low purity. Owen and Sykes have shown that for an initial target cell concentration of 1%, magnetic cell separation achieves a final sample purity of only 37% [2]. For these reasons, magnetic separation is often used as a pre-enrichment step before fluorescence-activated cell sorting (FACS) [3]. Clearly, improvements in magnetic capture efficiency and throughput would enable magnetic separation to capture a much larger portion of the global cell separation technology as it has significant advantages over FACS—primarily much lower cost and higher throughput.

Therefore, in order to significantly improve magnetic separation technology and capture a larger portion of the cell and biomolecule separation market—primarily in the high-throughput segment—a separating device, including rare earth magnet (NdFeB) array geometries, has been developed. In an embodiment, separation chambers that generate higher field gradients over large areas which, when coupled with novel sheet-flow separation chambers, enable faster and more efficient cell and biomolecule separation, and are easily scalable to handle large volume separations have been developed. Such a system would not only have a significant impact in large volume cell and biomolecule separation but has the potential to enable the implementation of clinical, extra corporeal magnetic filtration systems for inflammatory cytokine extraction and blood filtration.

Embodiments of the present disclosure include permanent magnet geometries and optimized sheet-flow separation chambers that are easily scalable and provide enhanced magnetic capture of biomolecules and cells from fluid samples. The sheet-flow design has the potential to be scaled for higher throughput by making larger arrays or stacking arrays and chambers in series or parallel, while keeping the height of the separation chamber constant and optimized for cell and biomolecule capture. This results in increased throughput without significant increases in the fluid velocity, achieved simply by changing the geometry and dimensions of the separation chambers.

Via rational design of high-gradient magnet arrays, a faster, more scalable, and more efficient cell and biomolecule sorting technology has been developed. Magnetic microparticle and nanoparticle-tagged cells respond rapidly to our proprietary magnet arrays, facilitating highly efficient cell separation from larger volumes over very short time periods—characteristics that are critical to cell studies, cell therapies, and pharmaceutical applications.

In order to develop easily scalable, highly efficient magnetic biomolecule and cell separation systems, the permanent magnet array geometries are aimed at increasing the force on magnetic particles within the magnetic separator using separation chamber geometries based on sheet flow rather than cylindrical systems, such as those currently on the market. Arrays with higher magnetic field gradients covering larger areas have been developed. Magnetic separation chamber geometry is designed to expose all particle-target conjugates to this stronger gradient/force via sheet flow rather than cylindrical flow. Three high-gradient permanent magnet array designs are shown in FIGS. 1.2A-B & 1.3A-C. These arrays produce lines of high magnetic field gradient across large surface areas. The three arrays include:

Magnetic Wedge Arrays—Initial 1D and 2D COMSOL theoretical models of wedge/sawtooth magnet arrays have demonstrated that very high gradients can be achieved at the apex of the wedge of these NdFeB arrays (FIG. 1.2A, 1.3A). These higher gradients will increase the force on the particles, facilitating enhanced magnetic force and more rapid separation of magnetic particle/biomolecule/cell conjugates. The arrays can be closely spaced and cover large areas to enhance capture from high volumes during sheet flow.

Magnetic Block Arrays—We also are designing, fabricating and, modeling prototype magnetic block arrays that produce exceptionally high gradients at the joins between rectangular block magnet segments, again, enhancing magnetic force on the particles (FIGS. 1.2B, 1.3B).

Magnetic Checkerboard Array—This array has the primary advantage in that by manipulating the size and polarity of the individual NdFeB cubes (as shown in FIG. 1.3C), it is possible to create very large surface areas of very high magnetic field gradients, enabling efficient scale-up of magnetic separation.

These current prototypes will be refined using the COMSOL models to optimize magnet size, spacing, dimensions and number. The force on magnetic particles within a fluid sample is proportional to the field gradient according to the equation:

$$F_m = (m \bullet \nabla)B = \frac{V_m \Delta\chi}{\mu_0}(B \bullet \nabla)B$$

where F is the magnetic translational force directed towards the field source, $\chi$ is the magnetic susceptibility, B is the magnetic flux density, m is the magnetic moment, $\mu_0$ is the magnetic permeability of free space, and $V_m$ is the volume of magnetic material. In magnetic separation systems, this magnetic force must exceed the Stoke's drag force as the sample moves through the separation chamber:

$$F_m > F_D \text{ where } F_D = 6\pi\eta R_m \Delta v$$

where $F_D$ is the drag force, $\eta$ is the dynamic viscosity, $R_m$ is the radius of the particle and v is the fluid velocity. As the magnetic field gradient decreases rapidly with distance from the magnet, scaling these systems presents a difficult problem—in fact, a major reason that there are so few high-volume/throughput systems on the market. Increasing the force and the area over which it applies impacts both the speed of particle/biomolecule/cell conjugate separation as well as simplifying scale-up via the use of large-area, low-height separation chambers.

COMSOL can be used in finite element modeling of magnetic particle capture in two and three dimensions to guide the design of the sheet-flow separation chambers described herein (length, width and height dimensions under varying flow rates/conditions) for each magnet array, modeling a variety of magnetic nano- and microparticles. We have demonstrated use of 3D COMSOL analysis of an 8-element NdFeB block array and a 2D COMSOL analysis of a 4-element NdFeB wedge array (FIGS. 1.4A-B).

By varying the width, height and length of the separation chamber in the COMSOL models, we will optimize the magnetic particle velocity within the chamber in order to enhance particle capture while maintaining the high fluid flow rates (100 mL/min.) required for high-volume/high-throughput magnetic particle separation. Particle parameters required by the model may be taken from superconducting quantum interference device (SQUID) magnetometry measurement of magnetization vs. field at room temperature.

Optimized magnet arrays generated from COMSOL modeling may be fabricated from NdFeB blocks, cubes and wedges (e.g., FIG. 1.3A-C), and separation chambers capable of separating 100 mL/min. with >95% capture efficiency can be designed and fabricated using AutoCAD and 3D printing (e.g. FIG. 1.5A-E). Benchmarking of the array/separation chamber designs generated during modeling work can be performed against the manufacturers' reported separation efficiency values for two commercial systems designed for low throughput—the Miltenyi SuperMACS II system and the StemCell Technologies BigEasy—as well as the Dexter Magnetics/Sigma-Aldrich LifeSep 500SX, designed for moderate to high volume separation (Table 1.1). Theory and initial 2D modeling indicate that the separation system should show a significant improvement in capture efficiency at large, easily scalable volumes, as well as provide equal or better capture efficiency at low volumes, compared to these market-leading commercial systems (FIG. 1.4A-B).

10 min. Pilot results with magnetic microspheres only, indicate that >99% of the microspheres (with no cells or biomolecules attached) were magnetically separated from a 5 mL volume after 10 min. (FIG. 1.5A-E). For continuous flow separation, the same cell protocols can be followed and the cells can be suspended in 500 mL of PBS and introduced into the flow chamber, providing one-pass flow over the magnet arrays (100 mL/min. flow rate) followed by collection of the supernatant and any uncaptured cells. Quantification of cell capture can be via flow cytometry (Sony iCyte). In addition to particle loading of HeLa cells as described above, separation of CD105+ human mesenchymal stromal stem cells and endothelial cells (AllCells—www.allcells.com) via CD105 antibody-conjugated Miltenyi microparticles can be evaluated following the manufacturer's cell incubation protocols (www.miltenyibiotec.com).

To benchmark purity rates, the same protocols can be followed, however, the target cells will be GFP-expressing HeLa reporter cells (Cell Biolabs, Inc.), which, after particle loading, can be introduced into a non-GFP/non-magnetic particle-loaded HeLa cell population at 1%, 5% and 15% concentrations, using the same total cell numbers and serial dilution as described above. Cell viability will be evaluated using MTT and cell titre blue assay following all experiments.

For evaluation and benchmarking of biomolecule separation, transforming growth factor-beta (TGF-β) latent complex can be conjugated to both Miltenyi magnetic microparticles and iron microspheres using Sulfo-SMCC conjugation protocols described in Monsalve et al. (2015—IEEE). Capture protocols can follow those outlined above for both low-volume and moderate-volume at the same flow rate. The amount of cytokine remaining in the supernatant, and by proxy the amount magnetically separated, can be quantified via recombinant human latent TFG-β enzyme-linked immunosorbent assay (ELISA—R&D Systems).

TABLE 1.1

Specifications of products against which the 42Bio separation system will be benchmarked.

| Product | Company | Price | Volume (mL) | Height (mm) | Width (mm) | Weight (kg) | Purity (%) | Recovery (%) |
|---|---|---|---|---|---|---|---|---|
| SpeedSep 5000* | Dexter | $116,320 | 5,000 | 479 | 762 | 81.6 | >99 | >99 |
| SuperMACS II | Miltenyi | $8,100 | 20 | 510 | 490 | 17.5 | >95 | 95 |
| DynaMag 50 | Dynal | $834 | 100 | 124 | 164 | 0.975 | >91.6 | >90 |
| BigEasy | StemCell Technologies | $1,188 | 14 | 100 | 17 | 1 | >93 | >99 |

*No manufacturer's specifications are available for the SpeedSep 500. The purity and recovery rates for the SpeedSep 5000 were used for benchmarking.

In order to benchmark cell recovery rates against low-volume systems, such as the SuperMACS and BigEasy systems, low-volume separation chambers can be modeled, designed and fabricated using the same process as outlined for the high-volume systems. For both low and moderate volumes systems described above, cell separation experiments can be performed on HeLa cells pre-incubated to 80% confluence in a T75 flask at 5% $CO_2$ and 37° C. Cells can be washed with PBS, and the Miltenyi and iron particles can be added the cells in culture media at a concentration of 0.5 mg/mL. The flask can be placed on a magnefect-nano™ transfection device for 1 hr. of magnetic field exposure (200 μm/2 Hz) to promote particle internalization. Unbound particles can be removed by two PBS washes, followed by trypsinization and isolation of the cells. Four serial dilutions starting at 1 million magnetic particle-loaded cells can be re-suspended in 20 mL & 50 mL of PBS, and introduced into the optimized separation chamber. The chamber can be placed on top of each of the three high-gradient arrays and placed on a rocker platform (1 Hz oscillation frequency) for

Example 2

Cardiopulmonary bypass (CPB), a procedure during which the patient's blood is passed through an extracorporeal loop, is an integral part of current open heart surgeries.[1] CPB often induces a systemic inflammatory response (SIR) via the release of pro-inflammatory cytokines, which causes complications ranging from fever to multi-system organ failure.[2,3] However, current methods aimed at reduction of these pro-inflammatory cytokines, such as glucocorticoids, are also associated with unwanted side effects.[3] Therefore, a method for reduction of pro-inflammatory cytokines following open heart surgery without side effects is needed. The aim of this work is to identify critical design parameters for a system which utilizes magnetic nanoparticles to remove unwanted pro-inflammatory cytokines. Ideally, this system will be incorporated into the currently used CPB machines. During CPB, the blood in the extracorporeal loop will be mixed with magnetic nanoparticles that have been conjugated with specific antibodies to recognize and bind the pro-inflammatory cytokines. Then, a high gradient magnetic array will be used to pull the magnetically tagged cytokines out of the flowing blood.

The magnetic force between magnetic nanoparticles and different NdFeB magnets configurations was calculated within the volume where the blood would be flowing, using finite-element analysis (COMSOL®) to solve the magneto-quasi-static Maxwell equations following the methods reported in Garraud et al.[4] To determine which magnetic configuration would produce the highest magnetic force on the particles the volumetric integral of the force in the channel was calculated. A Hall probe was used to measure the field strength of the NdFeB magnets, and the simulation was fitted to match. Magnetic nanoparticles were previously characterized using superconducting quantum interference device magnetometry and thermogravimetric analysis. Multiple magnetic particles (with varying magnetic properties, core diameters, and hydrodynamic diameters) were then simulated flowing in water atop the magnet in a "capture chamber". Drag and magnetic forces were analyzed, and the optimal magnetic particle was selected based on capture efficiencies. Optimal geometry for the capture chamber will be analyzed with the criteria of staying near the clinically used flow rate for extracorporeal loops. See FIG. 2.1 for an example simulation in 3D. Thus far, the magnetic configuration with the highest gradient (checkerboard magnetization pattern) and the particle type with the highest capture efficiency (20% 8.5 nm $Fe_3O_4$, 5000 nm polycaprolactone hydrodynamic diameter) have been identified. This work will provide a platform for the rational design of a magnetic separation chamber for the extracorporeal filtration of inflammatory cytokines during CPB.

REFERENCES FOR EXAMPLE 2

1. Sabiston Jr., D. C., Surg of the Chest, 1990, 5, 1107-1125.
2. Mojcik, C. F., Ann Thorac Surg, 2001, 71, 745-54.
3. Day, J. R. S, Inter J Surg, 2005, 3, 129-40.
4. Garraud, A., et al., TBME, 2015, 63, 2, 372-378

Example 3

FIG. 3.1 shows an example of one embodiment of the flow chamber. FIG. 3.2 illustrates testing of an embodiment of the present disclosure. In this case, maghemite particles are suspended in fluid at a concentration of 125 μg/mL and passed through the separator shown at the bottom of FIG. 3.1. Table 3.1 shows the test parameters and results. At a flow rate of 500 mL/min., 94.88% of the maghemite particles were extracted by the separator from a total volume of 80 mL. This demonstrates magnetic separation at more physiologically relevant flow rates in comparison to current magnetic separation systems.

TABLE 3.1

| Test Parameters and results<br>Dec. 16, 2016 Test Parameters and Results | |
|---|---|
| Flow Rate | 500 ml/min |
| Filtration Time | 10 min |
| Particles Used | Maghemite |
| Initial Particle Concentration | 125 μg/ml |
| Final Particle Concentration | 0.0064 mg/ml |
| Capture Efficiency | 94.88% |

The data shown in FIGS. 1.6, FIGS. 3.2, 3.3A-3.5 represent magnetic particle capture in the continuous flow separation system. The fluid flow rate, filtration time, initial particle concentration in the fluid, and final particle concentration after magnetic separation, are given in the tables. Capture efficiency is calculated by taking the ratio of the starting and ending particle concentrations. FIGS. 3.3A and 3.3B show the results of test runs using the particle separation devices and methods described herein. Both runs used a flow rate of 450 ml/min with maghemite nanoparticles and a wedge array. FIG. 3.3A was run for a duration of 10 mins on loop, with a total volume of 45 mL and a particle concentration of 445 μg/mL, where n=2. FIG. 3.3B shows a run with a single pass, and a total volume of 70 mL. The particle concentration was 35 μg/mL, where n=1.

FIGS. 3.4 and 3.5 show design iterations using different chamber geometries and polymer film materials. The device can include features such as push-to-connect tube connection, a smoothed surface (e.g. acetone), 100% infill, a sliding magnet chamber, compressible gasket(s), epoxy or other coating, silicone or other tubing materials, and other features envisioned by one skilled in the art. A visual representation of the filtering is demonstrated in FIG. 3.2 and Table 3.1, showing the beakers of fluid before and after magnetic separation. Table 3.2 compares the cell capture efficiency of the device and methods of the present example with a Miltenyi MagSep system (Miltenyi Biotec). The device of the present disclosure was more efficient at significantly higher volume (40×) and flow rate (1,000×) compared to the Miltenyi system. The viability of captured cells in these systems was not yet tested. The capture rate of the Miltenyi system was 61% in comparison with the 100% of the device described herein.

TABLE 3.2

Parameters and performance of iSeparator v. Miltenyi system

| Parameter | iSeparator (present disclosure) | Miltenyi |
|---|---|---|
| Flow Rate (ml/min) | 500 | 0.35-0.5 |
| Filtration Time (min) | 4 | 10 |
| Volume (mL) | 80 | 2 |
| n | 2 | 1 |
| Initial # cells | 1.3E+06 | 2.6E+06 |
| Final # cells | 0 | 1.02E+06 |

Table 3.3 compares the particle concentrations of a magnet-containing device described herein with a non-magnet cell capture device; "n" is the concentration of the non-captured supernatant. The total concentration is "n" plus the captured concentration. Some of the particle capture obtained by the no magnet device was due to particles sticking to the Kapton film and tubing. This was not an issue in the magnetic separator, likely because fewer particles were coming into contact with the Kapton and stayed mostly suspended in the flow fluid. [0001]

TABLE 3.3

| Particle concentrations of a magnet-containing device described herein with a non-magnet cell capture device | | |
|---|---|---|
| Parameter | Magnet | No magnet |
| Flow Rate (ml/min) | 500 | 500 |
| Filtration Time (min) | 10 | 10 |
| Particles used | Maghemite | Maghemite |
| Initial Particle concentration | Unknown | Co |
| Final Particle concentration | 0.125 mg/ml | 0.37 Co |
| n | 0.0064 mg/ml | 1.02E+06 |
| Concentration Reduction | 94.88% | 63% |

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. In an embodiment, the term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

We claim:

1. A separation device, consisting of: a magnetic array, and a horizontal sheet-flow separation chamber having only one entrance opening and only one exit opening, wherein the sheet-flow separation chamber is configured so that magnetic particles suspended in a fluid are continuously separated as the fluid flows across the sheet-flow separation chamber from the entrance opening to the exit opening, wherein dimensions of the fluid flow in plane are at least three times the depth of the fluid perpendicular to the plane, wherein the magnetic array is an electromagnet; and wherein the electromagnet comprises conducting coil loops and solenoids, magnetic coils, or combinations thereof, wherein the sheet-flow separation chamber is disposed under the magnetic array.

2. The separation device of claim 1, wherein the magnetic array is configured to generate multiple high gradient magnetic field lines that result in strong separation forces applied to the magnetic particles.

3. The separation device of claim 1, wherein the magnetic array is configured to generate multiple, intersecting, high gradient magnetic field lines that result in strong separation forces applied to the magnetic particles.

4. The separation device of claim 1, wherein the magnetic array comprises 1 to 100 magnets and the length of each magnet is about 1 cm to 1.5 m.

5. The separation device of claim 1, wherein the magnetic array is made of a rare earth metal material.

6. The separation device of claim 5, wherein the rare earth metal material is selected from the group consisting of: Neodymium-Iron-Boron, Samarium-Cobalt, and AlNiCo.

7. The separation device of claim 1, wherein the given flow rate is about 0.01 to 10 liters per minute.

8. A separation device, consisting of:

a magnetic array, and a sheet-flow separation chamber consisting of one entrance opening and consisting of one exit opening, wherein the sheet-flow separation chamber is configured so that magnetic particles suspended in a fluid are continuously separated as the fluid flows across the horizontal plane of the sheet-flow separation chamber from the entrance opening to the exit opening, wherein dimensions of the fluid flow in plane are at least three times the depth of the fluid perpendicular to the plane, wherein the magnetic array is an electromagnet; and wherein the electromagnet comprises conducting coil loops and solenoids, magnetic coils, or combinations thereof, wherein the sheet-flow separation chamber is disposed on a side of the magnet array.

9. The separation device of claim 8, wherein the magnetic array is configured to generate multiple high gradient magnetic field lines that result in strong separation forces applied to the magnetic particles.

10. The separation device of claim 8, wherein the magnetic array is configured to generate multiple, intersecting, high gradient magnetic field lines that result in strong separation forces applied to the magnetic particles.

11. The separation device of claim 8, wherein the magnetic array is made of a rare earth metal material.

12. The separation device of claim 11, wherein the rare earth metal material is selected from the group consisting of: Neodymium-Iron-Boron, Samarium-Cobalt, and AlNiCo.

13. The separation device of claim 8, wherein the given flow rate is about 0.01 to 10 liters per minute.

* * * * *